UNITED STATES PATENT OFFICE.

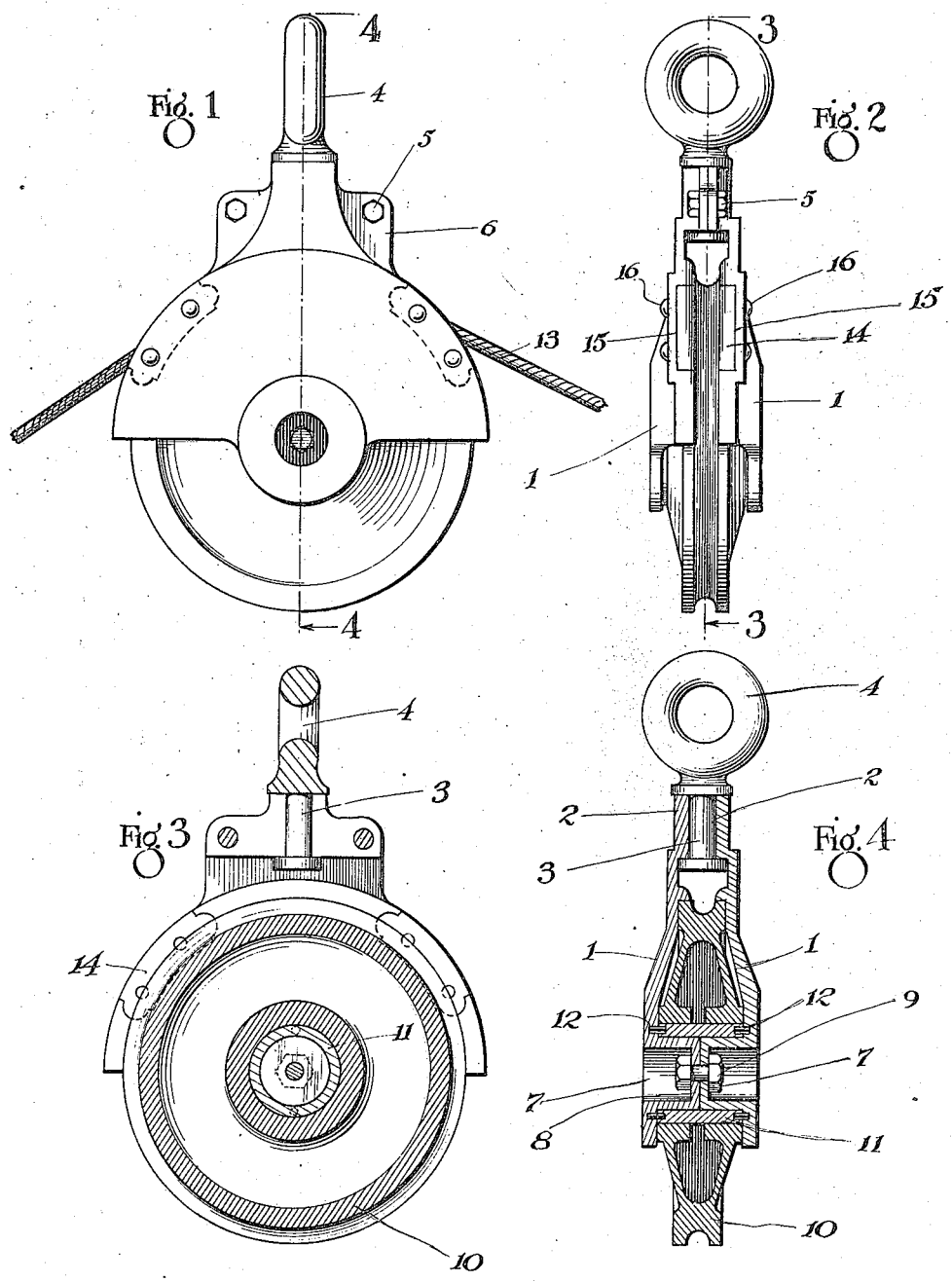

DUFF G. MANGES, OF MARYVILLE, TENNESSEE, ASSIGNOR TO D. G. MANGES & COMPANY, OF VOSE, TENNESSEE, A CORPORATION OF TENNESSEE.

SHEAVE BLOCK.

1,424,503.            Specification of Letters Patent.      Patented Aug. 1, 1922.

Application filed December 27, 1920. Serial No. 433,391.

*To all whom it may concern:*

Be it known that I, DUFF G. MANGES, a citizen of the United States, and a resident of Maryville, in the county of Blount and State of Tennessee, have invented certain new and useful Improvements in Sheave Blocks, of which the following is a specification.

My invention is an improvement in sheave blocks, and has for its object to provide a block of the character specified, having a new and improved mounting for the wheel arranged to wear uniformly.

A further object is to provide interchangeable wear plates, which may be detached when worn and replaced by new plates, arranged at the points engaged by the cable when the block is in use.

In the drawings:

Figure 1 is a side view of the improved sheave block,

Figure 2 is an edge view,

Figures 3 and 4 are sections on the lines 3—3 of Figure 2 and 4—4 of Figure 1, respectively.

In the present embodiment of the invention the pulley frame is composed of similar side or housing plates 1, which have cooperating vertically arranged bearing sections 2 at their upper ends, for engaging the headed pin 3 of the supporting eye 4 for the block, and the sections are secured together at the pin by means of bolts and nuts 5 which pass through flange lugs 6 on the sections. Each section 1 has an inwardly extending hollow axle or shaft portion 7, the said portions being in alinement and each having a transverse web 8 at its inner end, and these webs are connected by a bolt and nut 9, the head of the bolt and the nut being within the hollow shaft portions as shown.

The wheel 10 is journaled on the shaft portions, a bushing 11 of bronze or the like being arranged between the wheel and the axle or supporting member constituted by the hollow axle or shaft portions 7. This bushing is held from angular movement by means of dowel pins 12 which engage registering openings in the sections 1 and in the bushing.

It will be obvious that when this bushing becomes worn, it may be easily removed by detaching the frame sections, and may be replaced by a new bushing. At the points where the cable indicated at 13 engages the frame sections, said sections become quickly worn and when worn, they must be cast away. That is, the entire housing must be discarded.

In order to cure this difficulty, I provide wear plates 14 which are secured to the housing sections, at the points where the cable 13 engages said sections. Each of these wear plates as shown, is held in a recess or depression 15 on the inner face of the housing section, by any suitable means as for instance, by pins 16 on the plates which extend outwardly through openings in the sections and are headed, as shown.

When the wear plates become worn, the heads of the pins may be cut off and the wear plates replaced by new ones. Thus the life of the housing or frame is indefinite, the only particular wear being at the wear plates, and on the bushing both elements of which are removable.

I claim:—

1. A sheave block, comprising in combination with the housing sections and the pulley, each housing section having a hollow shaft section, said shaft sections abutting at their inner ends and having transverse webs fitting one against the other, a bolt traversing the webs for securing them together, the wheel being journaled on the shaft sections, and a bushing arranged between the wheel and the shaft sections, means in connection with the bushing and the housing sections for preventing movement of the bushing with the wheel, said means comprising dowel pins between the bushing and the housing sections.

2. A sheave block comprising in combination with the housing sections and the pulley, each housing section having a hollow shaft section, said shaft sections abutting at their inner ends, and having transverse webs fitting one against the other, a bolt traversing the webs for securing them together, the wheel being journaled on the shaft sections, and a bushing arranged between the wheel and the shaft sections, means in connection with the bushing and the housing sections for preventing movement of the bushing with the wheel.

3. A sheave block comprising in combination with the housing sections and the pulley, each housing section having a hollow shaft section, said shaft sections abutting at their inner ends, and having transverse webs fitting one against the other, a bolt traversing the webs for securing them together, the wheel being journaled on the shaft sections, and a bushing arranged between the wheel and the shaft sections.

4. A sheave block comprising in combination with the housing sections and the pulley, each housing section having a hollow shaft section, said shaft sections abutting at their inner ends, and having transverse webs fitting one against the other, a bolt traversing the webs for securing them together, the wheel being journaled on the shaft sections, and a bushing arranged between the wheel and the shaft sections, and detachable wear plates on each housing section at the opposite sides of the wheel at points where the cable on the wheel touches the housing, each housing section being recessed to receive the wear plates.

5. A sheave block comprising in combination with the housing sections and the pulley, each housing section having a hollow shaft section, said shaft sections abutting at their inner ends, and having transverse webs fitting one against the other, a bolt traversing the webs for securing them together, the wheel being journaled on the shaft sections, and a bushing arranged between the wheel and the shaft sections, and detachable wear plates on each housing section at the opposite sides of the wheel at points where the cable on the wheel touches the housing.

6. A sheave block comprising the combination with the housing sections and the pulley, of detachable wear plates on each housing section at the opposite sides of the wheel at points where the cable on the wheel touches the housing.

7. A sheave block having separable housing sections provided with inwardly extending hollow supporting members, means for securing said members together, said means being entirely received within said hollow supporting members, a bearing member interposed between said inwardly extending members and the sheave, and co-operating means between the housing sections and said bearing member for preventing rotation of said bearing member.

DUFF G. MANGES.